United States Patent [19]

Lillevold

[11] Patent Number: 5,870,148
[45] Date of Patent: Feb. 9, 1999

[54] METHOD AND APPARATUS FOR ADAPTIVELY ENABLING AND DISABLING PB FRAMES IN AN H.263 VIDEO CODER

[75] Inventor: Karl O. Lillevold, Hillsboro, Oreg.

[73] Assignee: Intel Corporation, Santa Clara, Calif.

[21] Appl. No.: 877,530

[22] Filed: Jun. 17, 1997

[51] Int. Cl.[6] ........................................ H04N 7/12
[52] U.S. Cl. .......................... 348/415; 348/409
[58] Field of Search ................... 348/409, 410, 348/411, 412, 413, 415, 416, 407; H04N 7/12

[56] References Cited

U.S. PATENT DOCUMENTS

| | | | |
|---|---|---|---|
| 5,565,922 | 10/1996 | Krause | 348/413 |
| 5,614,954 | 3/1997 | Jung | 348/413 |
| 5,764,921 | 6/1998 | Banham et al. | 348/415 |

OTHER PUBLICATIONS (Kwon et al., Very low bit rate video codec using variable blocksize Entropy–constrained Residual Vector Quantization IEEE, vol. 6, Issue 3) Jun. 1996.

(Whybray et al., H.263 Video Coding Recommendation for PSTN Video and Multimedia) May 1995.

(International Telecommunication Union, H.263 Telecommunications Standardization Sector of ITU) Mar. 1996.

*Primary Examiner*—Richard Lee
*Assistant Examiner*—Gims Philippe
*Attorney, Agent, or Firm*—Blakely, Sokoloff, Taylor & Zafman LLP

[57] ABSTRACT

A method and apparatus for adaptively enabling a PB frames mode for video data processing. If the PB frames mode is enabled for a given pair of video pictures, and if the motion compensated prediction error for the B-picture in the most recently encoded PB frame is greater than the motion compensated prediction error for the P-picture in same PB frame multiplied by a constant, the PB frames mode is disabled for the PB frame. Otherwise, the PB frames mode remains enabled. If the PB frame is disabled by the PB decision logic, it may remain disabled until certain encoding parameters are met.

29 Claims, 4 Drawing Sheets

METHOD AND APPARATUS FOR ADAPTIVELY ENABLING AND DISABLING PB FRAMES IN AN H.263 VIDEO CODER

BACKGROUND OF THE INVENTION (1) Field of the Invention

The present invention is related to the field of video coding, more specifically, the present invention is a method and an apparatus for adaptively enabling and disabling PB frames mode in an H.263 video coder.

(2) Related Art

The ITU-T H.263 standard (ITU-T std. H.263-1995, published March 1996) is a standard for a coded representation which can be used for compressing the moving picture component of audio-visual services at low bit rates. The coding algorithm of the H.263 is a hybrid of inter-picture prediction which utilizes temporal redundancy, and transform coding of the remaining signal to reduce spatial redundancy.

There are numerous different optional modes in H.263 including a PB frames mode in which two pictures are coded as one unit. The term "PB" stems from P-picture and B-picture. A PB-frame comprises one P-picture predicted from the previous decoded P-picture and one B-picture predicted from both the previous decoded P-picture and the P-picture currently being decoded. With this option, portions of the B-picture maybe bi-directionally predicted from the past and future pictures.

There are various trade-offs in selecting an optional mode provided by H.263. Because the modes are optional, it is not necessary for the decoder to support any of the optional modes. If a decoder supports a given mode, the encoder has the option to enable or disable that given mode.

Currently, few methods exist for determining whether to enable or disable an optional mode for H.263. Typically, an optional mode is enabled at the beginning of a video data sequence and stays on throughout the entire length of the video data sequence. The disadvantage of this method is that with some types of video, the optional mode results in decreased video quality. For other types of video, the increase in video quality does not justify the increase in the computational overhead associated with the optional mode being enabled.

Therefore a method and an apparatus are desirable for allowing a feedback mechanism to determine whether to enable or disable an optional mode to produce the best video quality given a video data sequence.

BRIEF SUMMARY OF THE INVENTION

A method and an apparatus for adaptively activating a PB frames mode for video data processing disclosed. The method and apparatus determines if the PB frames mode is enabled for a given video frame. If the PB frame mode is enabled, it is determined if the motion compensated prediction error for the B-picture of a PB frame for the given video frame is greater than the motion compensated prediction error for the P-picture in the PB frame multiplied by a constant. The PB frames mode is disabled if the motion compensated prediction error for the B-picture is greater than the motion compensated prediction error for the P-picture multiplied by a constant.

DETAILED DESCRIPTION OF THE INVENTION

The ITU-T H.263 standard (ITU-T std. H.263-1995, published March 1996) provides a PB frames mode which codes two pictures as one unit. The term "PB" stems from P-picture and B-picture types. The PB-frame comprises one P-picture predicted from the previous decoded P-picture and one B-picture predicted from both the previous decoded P-picture and the P-picture currently being decoded. With this option, portions of the B-picture maybe bi-directionally predicted from the past and future pictures.

The present invention provides a method and an apparatus for adaptively enabling and disabling the PB frames mode in an H.263 video coder.

Figure 1:
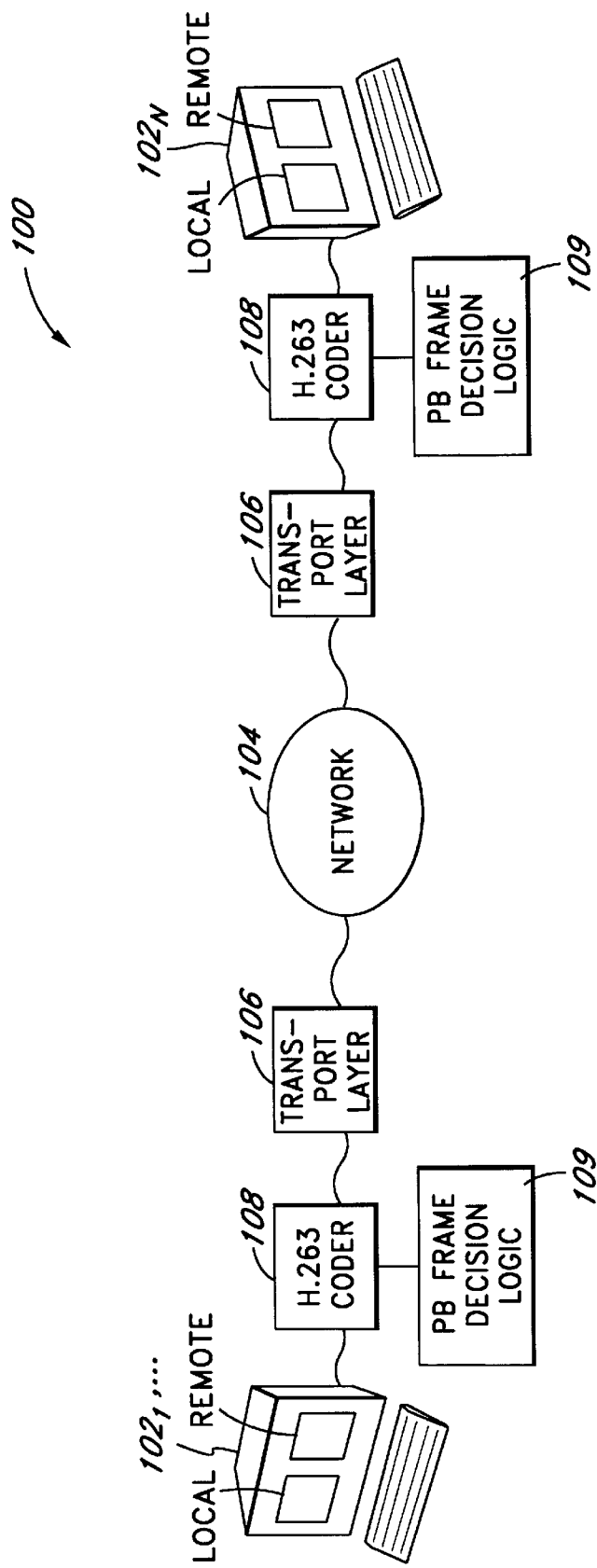
FIG. 1 is an exemplary video conferencing system with an embodiment of the present invention.

FIG. 1 is an exemplary video conferencing system with an embodiment of the present invention. Video conferencing system 100 has a plurality of computer systems $102_1$ through $102_N$ coupled to each other through network 104. Network 104 may be a public switched telephone network (PSTN), a local area network (LAN), an internet, etc. Each computer system 102 has a transport layer 106 and a video coder 108 with the present invention's PB frame decision logic 109.

Figure 2:
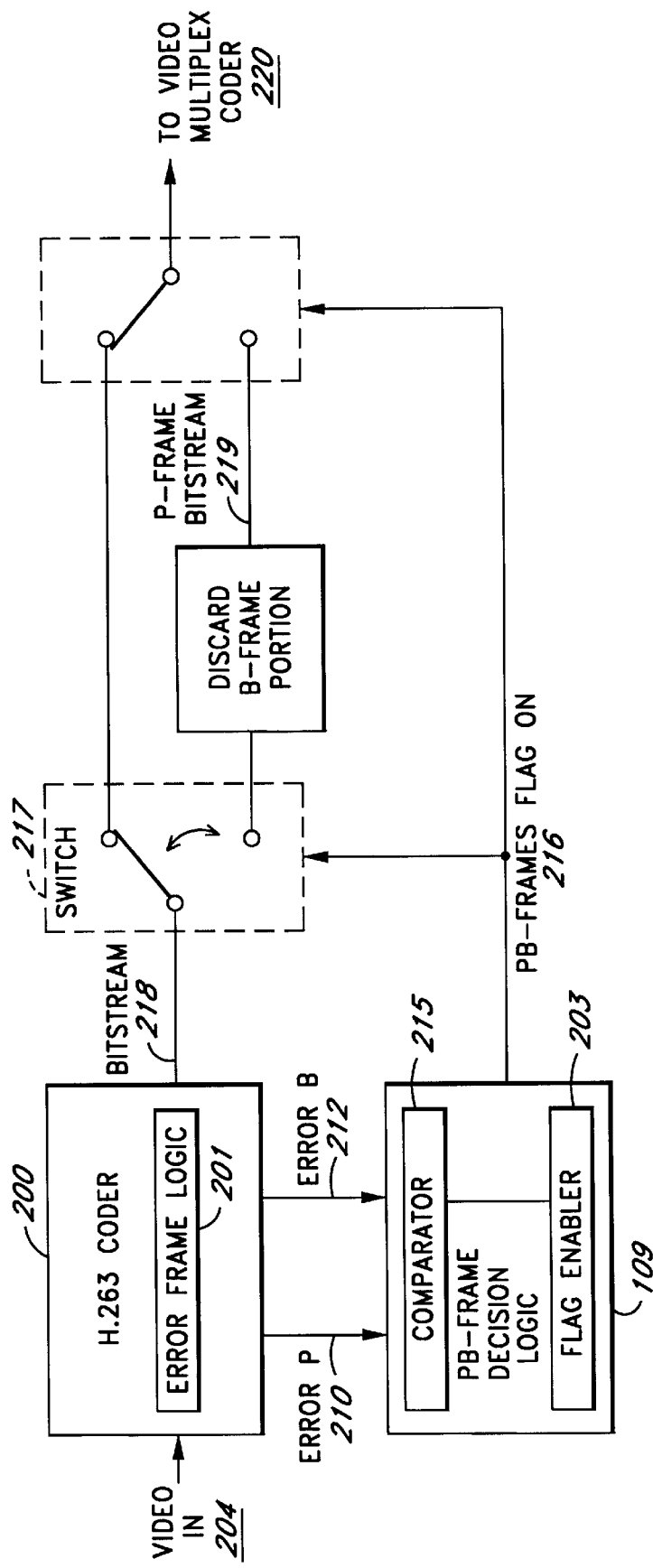
FIG. 2 illustrates an exemplary source coder coupled to the present invention's PB frames mode decision logic.
Figure 4:
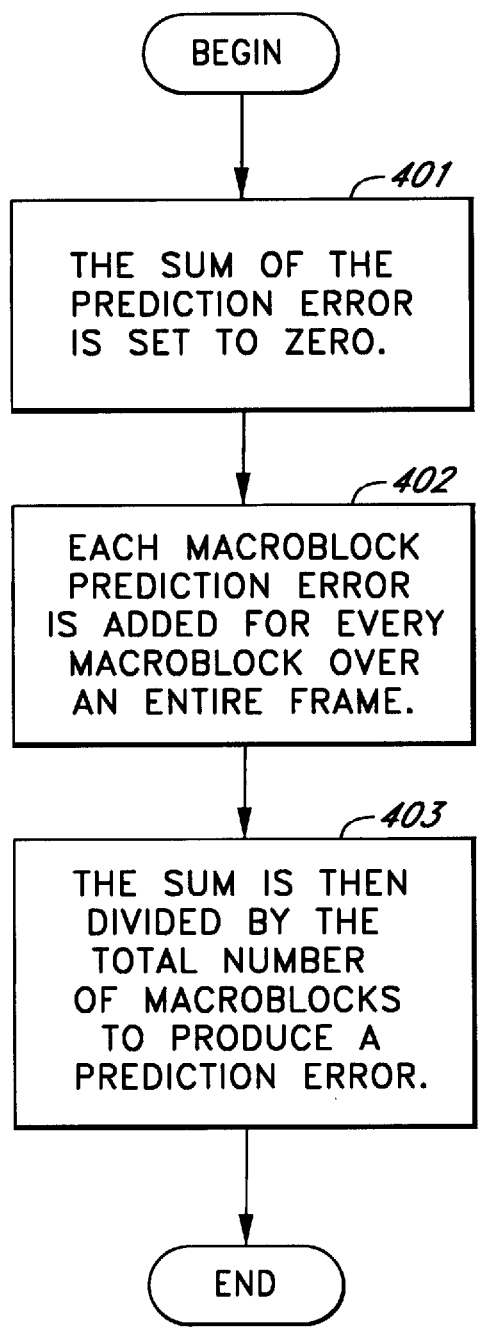
FIG. 4 illustrates the prediction error generation logic used to generate the Error P and Error B values used by the present invention.

FIG. 2 illustrates an exemplary source coder coupled to the present invention's PB frame decision logic. Coder 200 is coupled to PB frame decision logic 109. Coder 200 has error frame logic 201. Error P 210 is a motion compensated prediction error for the P-picture part of the PB-frame. Error B 212 is a motion compensated prediction error for the B-picture part of the PB-frame. A method implemented with the present invention error frame logic 201 to generate Error P 210 and Error B 212 is illustrated in FIG. 4. PB Frames Flag On 216 is a flag which indicates whether the PB frames mode is to be turned on. PB frames flag enabler 203 sets PB Frames Flag On 216 to true responsive to results produced by comparator 215. PB Frames Flag On 216 value is forwarded to coder 200 through switch 217 for the next frame.

More specifically, PB Frames Flag On 216 is initially set to true and the number of P-pictures is set to zero. The number of P-pictures is the number of P-pictures encoded while the PB frames mode is disabled. For each frame, if the PB frames mode is on, comparator 215 determines if the motion compensated prediction for the B-picture part of the PB-frame (Error B 212) is greater than the motion compensated prediction error for the P-picture part of the PB-frame multiplied by a constant (Error P 210).

If Error B 212 is greater than Error P 210 multiplied by a constant, then PB frame flag enabler 203 sets PB Frames Flag On 216 to false. Coder 200 receives PB Frames Flag On 216 with the value of true and turns PB frames mode off. The number of P-pictures is then set to zero. Further, the B-picture portion of the PB frame bit stream is discarded and the remaining P-picture bit stream 219 is forwarded to video multiplexer coder 220.

Otherwise, if the PB frames mode is off, the number of P-pictures encoded while the PB frames mode is disabled is incremented by one. If the number of P-pictures is greater than a predetermined P threshold, then PB frames flag enabler 203 sets PB Frames Flag On 216 to true and coder 200 turns the PB frames mode on. Bit stream 218 is then forwarded to video multiplexer coder 220.

Figure 3:
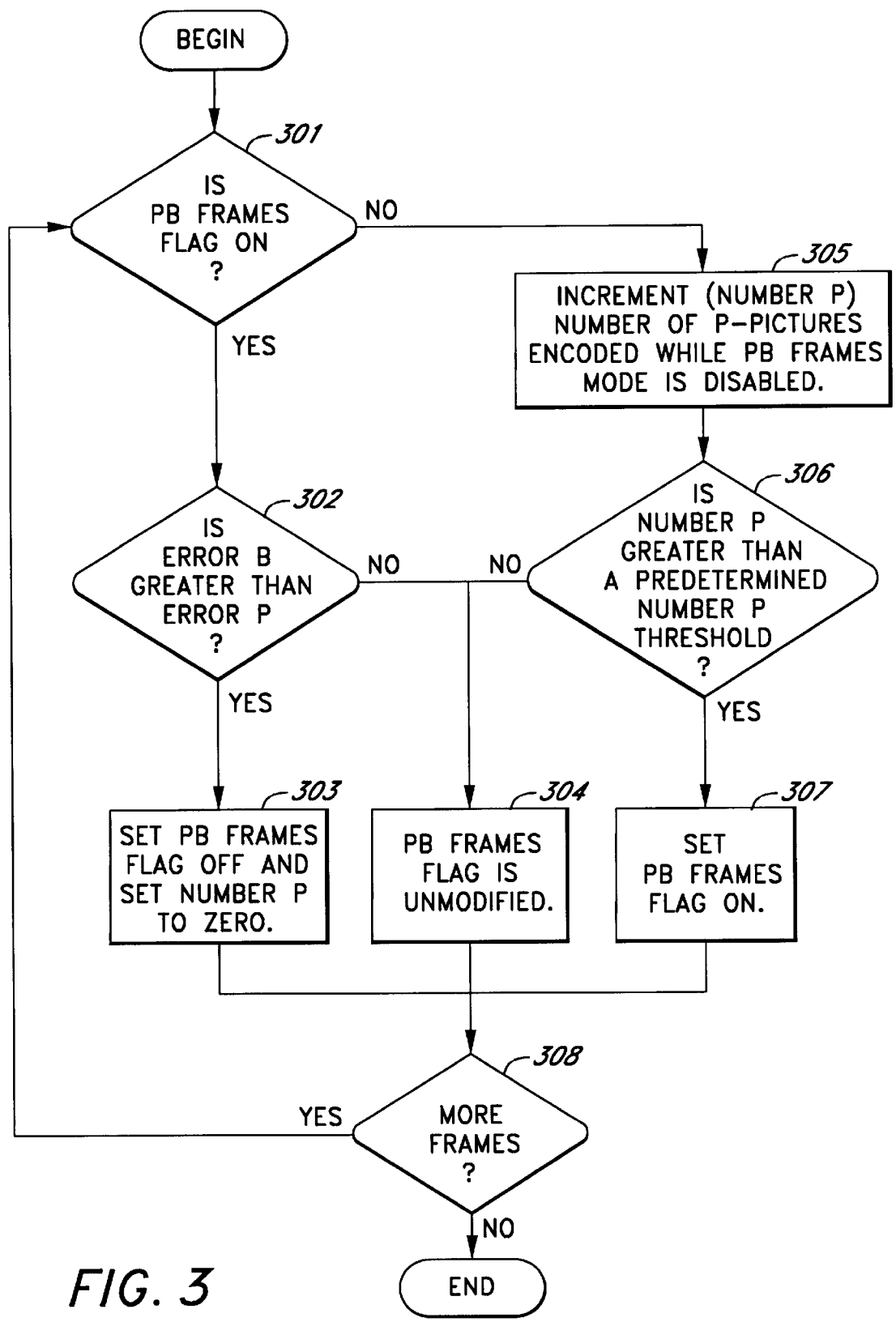
FIG. 3 is an exemplary flow diagram illustrating the general steps followed by the PB frames mode decision logic.

FIG. 3 illustrates an exemplary flow diagram of the PB frames mode decision logic. Initially, the PB frames mode is set to true (e.g. PB frames mode is on) and the number of P-pictures (number-P) is set to zero. After each frame is encoded, the value for PB frames mode is modified.

If the PB frames mode is switched off (false), the B-picture portion of the encoded frame is discarded before sending the bit stream to the video multiplexer coder for further processing.

More specifically, in block 301, if the PB frames mode is on, then in block 302, it is determined whether the error value for the B-picture part of the PB frame is greater than the error value for the P-picture part of the PB frame multiplied by a constant. In block 303, if the error value for the B-picture part of the PB frame is greater than the error value for the P-picture part of the PB frame multiplied by a constant, then the PB frames mode is turned off and the number-P is set to zero. The number-P is the number of P-pictures encoded while PB frames mode is disabled. In block 304, if the error value for the B-picture part of PB frame is less than or equal to the error value for the P-picture part of the PB frame multiplied by a constant, then the PB frames mode remains on.

Back in block 301, if the PB frames mode is off, then in block 305 the number of P-pictures encoded while the PB frames mode is disabled is incremented by one. In block 306, if the number of P-pictures is greater than the number of a predetermined P threshold, then in block 307, the PB frames mode is turned on. Otherwise, in block 304, the PB frames mode remains off. In block 308, if there are more frames to be processed, then the process flow returns to block 301. Otherwise, the process flow terminates.

FIG. 4 illustrates a method of implementation of the prediction error generation logic used to generate the Error P and Error B values of the present invention. In step 401, the sum of the prediction error is set to zero. In step 402, given a video frame, each macroblock prediction error is added for every macroblock over the entire frame. In step 403, the sum is then divided by the total number of macroblocks in that given frame to produce a prediction error for the given video frame.

What has been described is a method and apparatus for adaptively enabling and disabling the PB frames mode in an H.263 video coder. The ITU-T H.263 standard (ITU-T std. H.263-1995, published March 1996) provides a PB frames mode which codes two pictures as one unit. The term "PB" stems from P-picture and B-picture types. PB-frame comprises one P-picture predicted from the previous decoded P-picture and one B-picture predicted from both the previous decoded P-picture and the P-picture currently being decoded. With this option, portions of the B-picture maybe bi-directionally predicted from the past and future pictures. The present invention's PB frame decision logic adaptively enables and disables the PB frames mode to produce the best video quality given a video data sequence.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed:

1. A method for adaptively activating PB frames mode of a video coder for video data processing comprising the steps of:

determining if a PB frames mode is enabled for a given video frame;

determining if a motion compensated prediction error for a B-picture of a PB video frame of said given video frame is greater than a motion compensated prediction error for a P-picture of said PB video frame if said PB frames mode is enabled; and disabling said PB frames mode if said motion compensated prediction error for said B-picture is greater than said motion compensated prediction for said P-picture multiplied by a constant.

2. The method of claim 1 further comprising the step of determining if said PB frames mode is disabled for a given video frame.

3. The method of claim 2 wherein if said PB frames mode is disabled for said given video frame, then a number of P-pictures encoded while said PB frame mode is disabled is incremented by one.

4. The method of claim 3 further comprising the step of determining if the number of P-pictures encoded while said PB frame mode is disabled is greater than a predetermined threshold.

5. The method of claim 4 further comprising the step of enabling said PB frames mode if said number of P-pictures encoded while said PB frame mode is disabled is greater than said predetermined threshold.

6. An apparatus for adaptively enabling a PB frames mode of a video coder for video data processing comprising:

the video coder for processing video data stream; and a PB frame decision logic coupled to the video coder, said PB frame decision logic for adaptively enabling and disabling a PB frames mode of the video coder.

7. The apparatus of claim 6 wherein said PB frame decision logic comprises a comparator for determining if a motion compensated prediction error for a B-picture of a PB video frame of a given video frame is greater than a motion compensated prediction error for a P-picture of said PB video frame if said PB frames mode is enabled.

8. The apparatus of claim 6 wherein said PB frame decision logic comprises a PB flag enabler coupled to said comparator, said PB flag enabler for setting a PB frame on flag to false if said comparator determines that said motion compensated prediction error for a B-picture of said PB video frame is greater than said motion compensated prediction error for a P-picture of said PB video frame multiplied by a constant.

9. The apparatus of claim 7 wherein said comparator determines if the number of P-pictures encoded while said PB frames mode is disabled is greater than a predetermined threshold.

10. The apparatus of claim 8 wherein said PB frame flag enabler sets said PB frame on flag to true if said number of P-pictures encoded while said PB frames mode is disabled is greater than said predetermined threshold.

11. The apparatus of claim 9 wherein said number of P-pictures is incremented by one if said PB frames on flag is disabled.

12. A system for adaptively enabling and disabling a PB frames mode of a video coder for video data processing comprising:

the video coder for processing video data stream received through a network;

a PB frame decision logic coupled to the video coder, said PB frame decision logic for adaptively enabling and disabling a PB frames mode of the video coder; and a transport layer connecting said video coder to said network.

13. The system of claim 12 wherein said PB frame decision logic comprises a comparator for determining if a motion compensated prediction error for a B-picture of a PB video frame of a given video frame is greater than a motion compensated prediction error for a P-picture of said PB video frame if said PB frames mode is enabled.

14. The system of claim 12 wherein said PB frame decision logic comprises a PB flag enabler coupled to said comparator, said PB flag enabler for setting a PB frame on flag to false if said comparator determines that said motion compensated prediction error for a B-picture of said PB video frame is greater than said motion compensated prediction error for a P-picture of said PB video frame multiplied by a constant.

15. The system of claim 13 wherein said comparator determines if the number of P-pictures encoded while said PB frames mode is disabled is greater than a predetermined threshold.

16. The system of claim 14 wherein said PB frame flag enabler sets said PB frame on flag to true if said number of P-pictures encoded while said PB frame mode is disabled is greater than said predetermined threshold.

17. The system of claim 15 wherein said number of P-pictures is incremented by one if said PB frames on flag is set to false.

18. An apparatus for adaptively enabling a PB frames mode of a video coder for video data processing comprising:

means for processing video data stream; and means for enabling and disabling a PB frames mode of said means for processing, said means for enabling coupled to said means for processing.

19. The apparatus of claim 18 wherein said means for enabling comprises means for determining if a motion compensated prediction error for a B-picture of a PB video frame of a given pair of video pictures is greater than a motion compensated prediction error for a P-picture of said PB video frame if said PB frames mode is enabled.

20. The apparatus of claim 18 wherein said means for enabling comprises means for setting a PB frame on flag to false if said comparator determines that said motion compensated prediction error for a B-picture of said PB video frame is greater than said motion compensated prediction error for a P-picture of said PB video frame, said means for setting coupled to said means for determining.

21. The apparatus of claim 19 wherein said means for determining determines if the number of P-pictures encoded while said PB frames mode is disabled is greater than a predetermined threshold.

22. The apparatus of claim 20 wherein said means for setting sets said PB frame on flag to true if said number of P-pictures encoded while said PB frame mode is disabled is greater than said predetermined threshold.

23. The apparatus of claim 21 wherein said number of P-pictures is incremented by one if said PB frames on flag is set to false.

24. A system for adaptively enabling and disabling a PB frames mode of a video coder for video data processing comprising:

means for processing video data stream;

means for enabling and disabling a PB frames mode of said means for processing; and means for transporting connecting said means for processing to a network.

25. The system of claim 24 wherein said means for enabling comprises means for determining if a motion compensated prediction error for a B-picture of a PB video frame of a given pair of video pictures is greater than a motion compensated prediction error for a P-picture of said PB video frame multiplied by a constant if said PB frames mode is enabled.

26. The system of claim 24 wherein said means for enabling comprises means for setting a PB frame on flag to false if said comparator determines that said motion compensated prediction error for a B-picture of said PB video frame is greater than said motion compensated prediction error for a P-picture of said PB video frame, said means for setting coupled to said means for determining.

27. The system of claim 25 wherein said means for determining further determines if the number of P-pictures encoded while said PB frames mode is disabled is greater than a predetermined threshold.

28. The system of claim 26 wherein said means for setting sets said PB frame on flag to true if said number of P-pictures encoded while said PB frame mode is disabled is greater than said predetermined threshold.

29. The system of claim 27 wherein said number of P-pictures is incremented by one if said PB frames on flag is set to false.

* * * * *

UNITED STATES PATENT AND TRADEMARK OFFICE
CERTIFICATE OF CORRECTION

PATENT NO.   : 5,870,148
DATED        : February 9, 1999
INVENTOR(S)  : Lillevold It is certified that error appears in the above-identified patent and that said Letters Patent is hereby corrected as shown below:

Column 1,
Line 53, before "disclosed", insert -- are --.

Signed and Sealed this

Thirteenth Day of May, 2003

JAMES E. ROGAN
*Director of the United States Patent and Trademark Office*